United States Patent
Barberger et al.

(10) Patent No.: US 12,203,410 B1
(45) Date of Patent: Jan. 21, 2025

(54) HOUSING ASSEMBLY FOR ROTARY ENGINE

(71) Applicant: PRATT & WHITNEY CANADA CORP., Longueuil (CA)

(72) Inventors: Jeremie Barberger, Montreal (CA); Raphael Paquet, Boucherville (CA); Vincent Savaria, Laval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/351,653

(22) Filed: Jul. 13, 2023

(51) Int. Cl.
*F02B 55/00* (2006.01)
*F02B 55/08* (2006.01)
*F02B 55/14* (2006.01)

(52) U.S. Cl.
CPC ............ *F02B 55/08* (2013.01); *F02B 55/00* (2013.01); *F02B 55/14* (2013.01)

(58) Field of Classification Search
CPC .......... F02B 55/00; F02B 55/08; F02B 55/14; F01C 21/06; F01C 21/08; F04C 2240/00; F04C 2240/30; F04C 2240/80; F04C 2240/801; F04C 2270/16
See application file for complete search history.

(56) References Cited

U.S. PATENT DOCUMENTS

| | | | |
|---|---|---|---|
| 3,554,677 A * | 1/1971 | Zapf et al. | C23C 4/11 418/178 |
| 3,799,706 A | 3/1974 | Bilobran | |
| 3,918,137 A * | 11/1975 | Telang | F01C 21/104 29/527.3 |
| 3,923,432 A * | 12/1975 | Nakakobara | F01C 21/10 418/179 |
| 3,981,688 A * | 9/1976 | Telang | F02B 55/00 29/527.3 |
| 4,633,829 A | 1/1987 | Kollen | |
| 5,149,257 A | 9/1992 | Iio | |
| 5,626,674 A * | 5/1997 | VanKuiken, Jr. | C23C 4/02 29/888.06 |
| 2016/0160324 A1 | 6/2016 | Okun | |
| 2019/0195132 A1* | 6/2019 | Tajiri | F02C 7/18 |
| 2020/0200009 A1* | 6/2020 | Gagnon-Martin | F04C 27/008 |
| 2020/0306885 A1 | 10/2020 | Bobel et al. | |
| 2021/0205882 A1 | 7/2021 | Liu | |

(Continued)

FOREIGN PATENT DOCUMENTS

EP 449356 B1 8/1995

*Primary Examiner* — Dapinder Singh
(74) *Attorney, Agent, or Firm* — NORTON ROSE FULBRIGHT CANADA LLP (57) ABSTRACT

A housing assembly for a rotary engine, has: a rotor housing having a peripheral inner face, a first face and a second face; a first side housing secured to the first side and defining a first inner side face fac; and a second side housing secured to the second side and defining a second inner side face, the rotor cavity bounded axially between the first side housing and the second side housing, one or more of the rotor housing, the first side housing, and the second side housing having: a main body made of a base material; and an external layer made of an alloy including the base material, a wear-resistance of the alloy greater than that of the base material, the external layer defining one or more of the first face, the second face, the first inner side face, and the second inner side face.

17 Claims, 8 Drawing Sheets

(56) References Cited

U.S. PATENT DOCUMENTS

2021/0354200 A1 11/2021 Nauka et al.
2022/0220587 A1 7/2022 Pun
2022/0220589 A1 7/2022 Pun

* cited by examiner

HOUSING ASSEMBLY FOR ROTARY ENGINE

TECHNICAL FIELD

The application relates generally to aircraft engine and, more particularly, to rotary internal combustion engines and for housings thereof.

BACKGROUND

Combustion chambers of a rotary engine, such as a Wankel engine, are delimited radially by the rotor and rotor housing and axially by side housings. The side housings have faces oriented toward the combustion chambers and are thus subjected to high pressure and thermal loads. On the other hand, the side housings provide running surfaces for side seals of the rotor.

SUMMARY

In one aspect, there is provided a housing assembly for a rotary internal combustion engine, comprising: a rotor housing extending around an axis, the rotor housing having a peripheral inner face facing a rotor cavity, a first face at a first side and a second face at a second side opposite to the first side; a first side housing secured to the first side of the rotor housing, the first side housing defining a first inner side face facing the rotor cavity and the rotor housing; and a second side housing secured to the second side of the rotor housing, the second side housing defining a second inner side face facing the rotor cavity and the rotor housing, the rotor cavity bounded axially between the first side housing and the second side housing, one or more of the rotor housing, the first side housing, and the second side housing having: a main body made of a base material; and an external layer made of an alloy including the base material, a wear-resistance of the alloy greater than that of the base material, the external layer defining one or more of the first face of the rotor housing, the second face of the rotor housing, the first inner side face of the first side housing, and the second inner side face of the second side housing.

The housing assembly described above may include any of the following features, in any combinations.

In some embodiments, the main body and the external layer are monolithically connected to one another.

In some embodiments, the alloy has a hardness greater than that of the base material.

In some embodiments, the base material is aluminum and the alloy is aluminum-silicon-carbide.

In some embodiments, a thickness of the external layer is at least about 5 thousandths of an inch.

In some embodiments, the thickness of the external layer is at most about 125 thousandths of an inch.

In some embodiments, the external layer includes a transition layer extending from the main body.

In some embodiments, a ratio of a mass of the base material to a mass of the alloy by unit of volume gradually decreases within the transition layer from the main body.

In some embodiments, the rotor housing defines at least one cooling passage extending from the first face to the second face, the at least one cooling passage being countersunk at one or more of the first face and the second face.

In some embodiments, the first side housing includes a side wall secured to the rotor housing and a side plate, a peripheral section of the side plate disposed between the side wall and the rotor housing.

In some embodiments, the side plate is made of silicon carbide, the first inner side face extending around the side plate and abutting the first face of the rotor housing.

In some embodiments, both of the first inner side face and the first face are defined by the alloy.

In another aspect, there is provided a rotary internal combustion engine including the housing assembly described above and a rotor received within the rotor cavity.

In yet another aspect, there is provided a method of manufacturing a housing assembly for a rotary internal combustion engine, the housing assembly having a rotor housing and two side housings secured to the rotor housing to define a rotor cavity, the method comprising: obtaining a main body of one or more of the rotor housing and the two side housings, the main body made of a base material; and adding a layer of an alloy including the base material to the main body via additive manufacturing, the alloy being more wear-resistant than the base material, the layer defining a face either contacting another one of the one or more of the rotor housing and the two side housings or facing the rotor cavity.

The method described above may include any of the following features, in any combinations.

In some embodiments, the method includes performing a machining step on the face to reach desired dimensions of the one or more of the rotor housing and the two side housings.

In some embodiments, the obtaining of the main body made of the base material includes obtaining the main body made of aluminum.

In some embodiments, the adding of the layer of the alloy includes adding a layer of aluminum-silicon-carbide.

In some embodiments, the adding of the layer of the alloy via additive manufacturing includes successively adding sub-layers on top of one another using a plurality of feedstock having a decreasing ratio of a mass of the base material to a mass of the alloy by unit of volume.

In some embodiments, the method includes obtaining cooling passages in the main body of the rotor housing before the adding of the layer of the alloy.

In some embodiments, the method includes countersinking the cooling passages before the adding of the layer of the alloy.

BRIEF DESCRIPTION OF THE DRAWINGS

Reference is now made to the accompanying figures in which.

DETAILED DESCRIPTION

Figure 1:
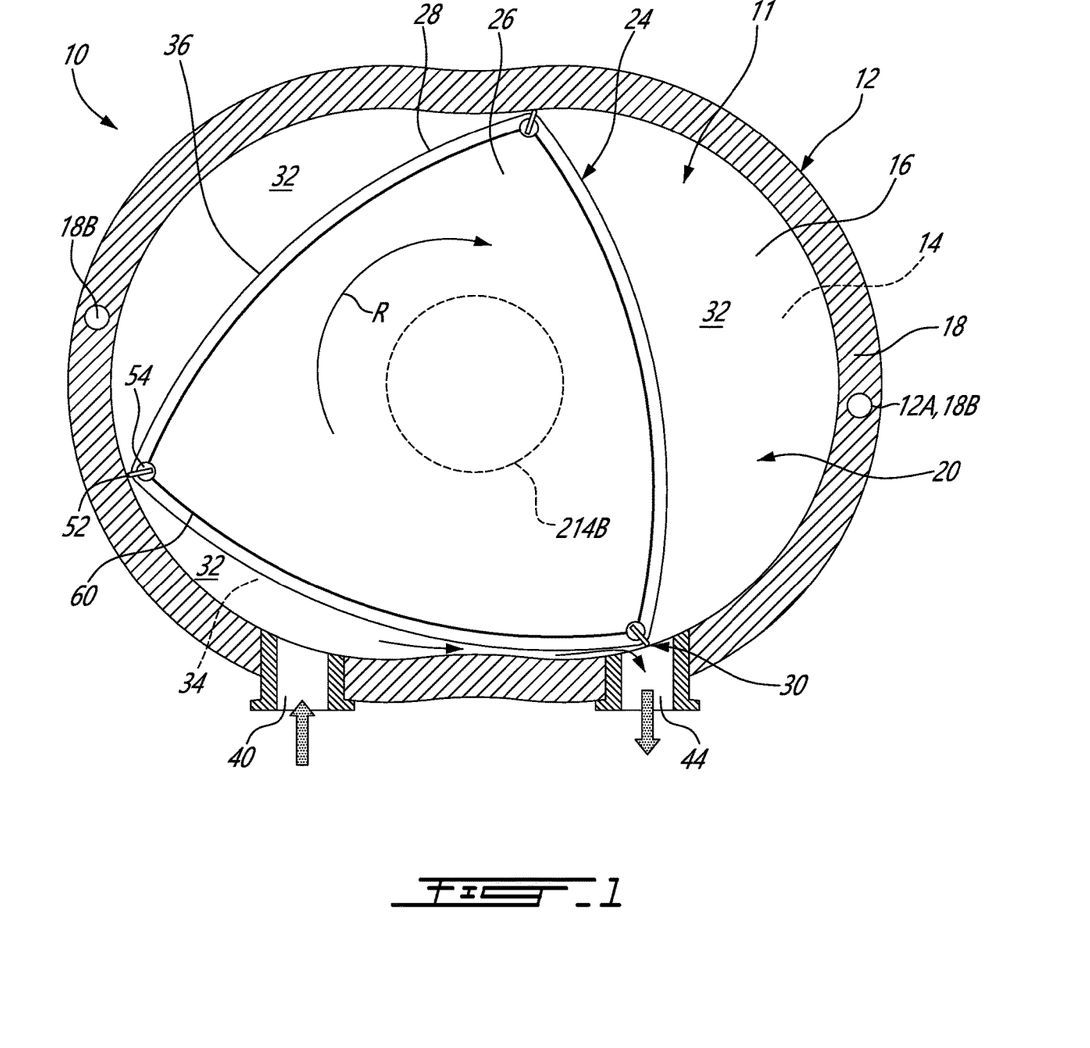
FIG. 1 is a cross-sectional view of a rotary internal combustion engine in accordance with one embodiment.

Referring to FIG. 1, a rotary internal combustion engine, referred to simply as a rotary engine below, which may be a Wankel engine, is schematically shown at 10. The rotary engine 10 comprises an outer body also referred to as a housing assembly 12 having axially-spaced side housings 11, which each includes a side wall 14 and a side plate 16 mounted to the side wall 14, with a rotor housing 18 extending from one of the side housings 11 to the other, to form a rotor cavity 20. The rotor housing 18 has a first side and a second side opposite to the first side. The side housings 11 include a first side housing secured to the first side and a second side housing secured to the second side. The rotor cavity 20 is defined axially between the side housings 11 and circumscribed by the rotor housing 18. In FIG. 1, the side wall 14 is indicated with a dashed line because it sits below the side plate 16. The inner surface of the rotor housing 18 has a profile defining two lobes, which may be an epitrochoid. In some alternate embodiments, the side housings 11 include solely the side wall, that is, the side wall and the side plate may be combined into a single element.

The housing assembly 12 includes a coolant circuit 12A, which may include a plurality of coolant conduits 18B defined within the rotor housing 18. As shown more clearly in FIG. 5, the coolant conduits 18B extends from one of the side housings 11 to the other. The coolant circuit 12A is used for circulating a coolant, such as water or any suitable coolant, to cool the housing assembly 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending there between. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and housing assembly 12. The combustion chambers 32 vary in volume with rotation of the rotor 24 within the housing assembly 12. The geometrical axis of the rotor 24 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the housing assembly 12 is illustrated. As briefly introduced above, the side housings 11 include the side walls 14 that are secured to the rotor housing 18. Each of the side walls 14 has a portion located proximate an outer perimeter P (FIG. 4) of the side wall 14 and configured to be in abutment against the rotor housing 18 for defining the rotor cavity 20.

In the embodiment shown, each of the side walls 14 is configured to be secured to a respective one of opposed ends of the rotor housing 18. The side housings 11 further include side plates 16 located on inner sides of the side walls 14. The side plates 16 define rotor-engaging faces 16A on which the side seals 60 and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16. The side plates 16 may however be entirely made of the hard material, such as silicon carbide. The side plates 16 may be made of aluminum, steel, or any suitable ceramic material.

Figure 4:
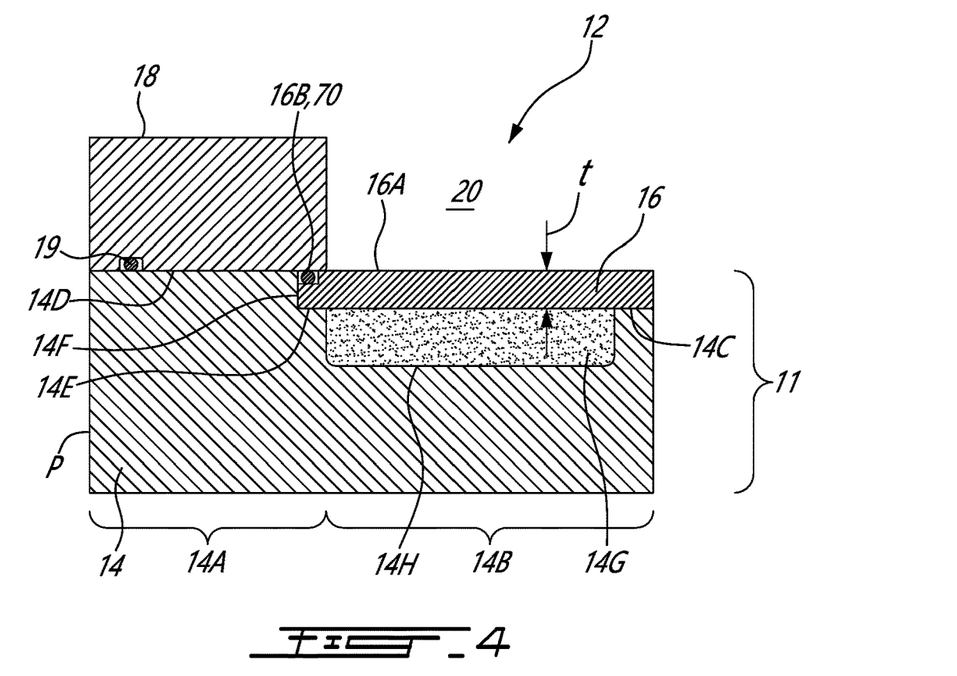
FIG. 4 is a cross-sectional view taken along line B-B of FIG. 2 in accordance with one embodiment.

Referring more particularly to FIG. 4, the side wall 14 includes a peripheral section 14A, which is in abutment with the rotor housing 18, and a center section 14B, which is circumferentially surrounded by the peripheral section 14A. In the disclosed embodiment, the peripheral section 14A of the side wall 14 is secured to the rotor housing 18. The center section 14B of one of the side walls 14 faces the center section 14B of the other of the side walls 14. The side walls 14 are secured to the rotor housing 18 with any suitable means known in the art. As shown, a sealing member 19 is located between the rotor housing 18 and the peripheral sections 14A of the side walls 14 for limiting coolant from leaking out. The sealing member 19 may be an O-ring. The sealing member 19 may be received within an annular recess, which may be defined by one or more of the rotor housing 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the rotor housing 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the rotor housing 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24. The side plate 16 may be supported by a housing in the center to limit the movement of the side plate 16.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the rotor housing 18 and the side wall 14 might be minimized.

To limit axial movements of the side plate 16 relative to the axis of rotation of the rotor 24 (FIG. 1), a periphery of the side plate 16 is contained axially between the rotor housing 18 and the side wall 14. In other words, the periphery of the side plate 16 is sandwiched between the side wall 14 and the rotor housing 18. A seal 70 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the seal 70 is contained within a groove 16B defined by the side plate 16. The seal 70 is described in detail below.

In a particular embodiment, the seal 70 and the abutment surface 14F of the side wall 14 allows the side plate 16 to move radially relative to the side wall 14. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansion.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuit 12A and is in fluid flow communication with the coolant conduits 18B that are defined in the rotor housing 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
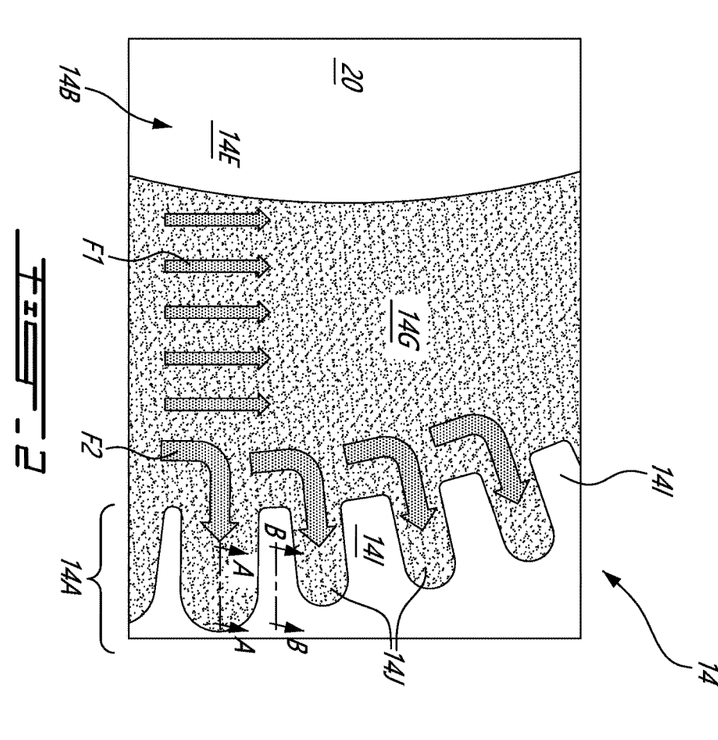
FIG. 2 is a fragmented top view of a side wall of a side housing of the rotary internal combustion engine of FIG. 1.
Figure 3:
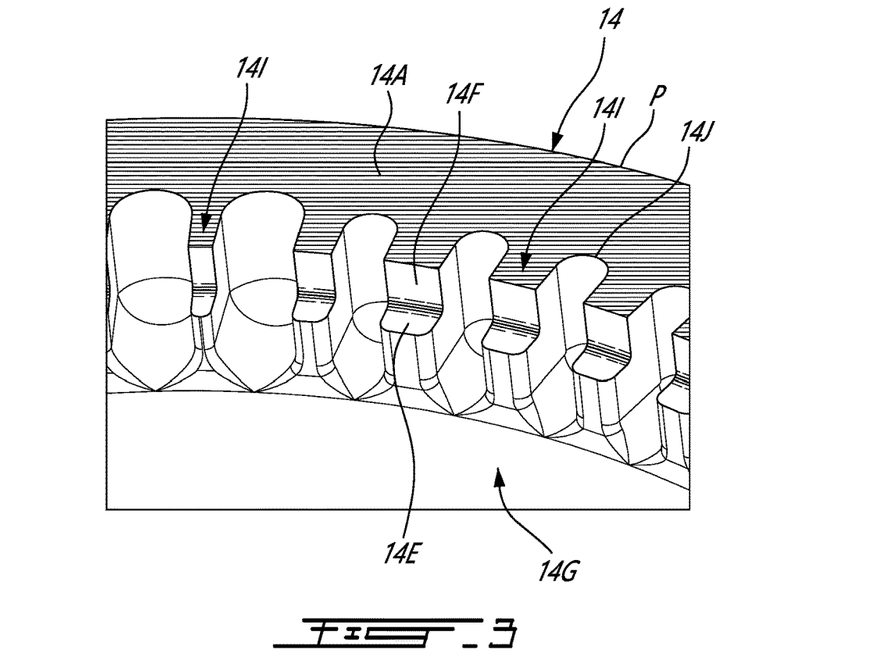
FIG. 3 is a fragmented three-dimensional view of the side housing of FIG. 2.

As shown in FIGS. 2-3, the peripheral section 14A of the side wall 14 defines a plurality of ribs 141 that are circumferentially distributed around the rotor cavity 20. The ribs 141 defines the abutment surface 14F and a portion of the surface 14E of the center section 14B of the side wall 14. Consequently, and in the depicted embodiment, the abutment surface 14F is defined by a plurality of surfaces defined by the ribs 141. The ribs 141 may be configured to support a pressure load imparted by a combustion of a mixture of air and fuel within the combustion chambers 32.

Cavities or spaces 14J are defined between the ribs 141. More specifically, each pair of two consecutive ones of the ribs 141 defines a space 14J therebetween. The spaces 14J are in fluid communication with the pocket 14G and with the coolant conduits 18B of the rotor housing 18. Stated otherwise, the coolant conduits 18B are in fluid communication with the pocket 14G via the spaces 14J between the ribs 141. The spaces 14J may allow the liquid coolant to flow from the pocket 14G to the coolant conduits 18B of the rotor housing 18. It is understood that the liquid coolant may be circulated in closed loop and through a heat exchanger. The heat exchanger may be used to dissipate heat to an environment outside the engine; the heat transferred from the engine to the liquid coolant.

Figure 5:
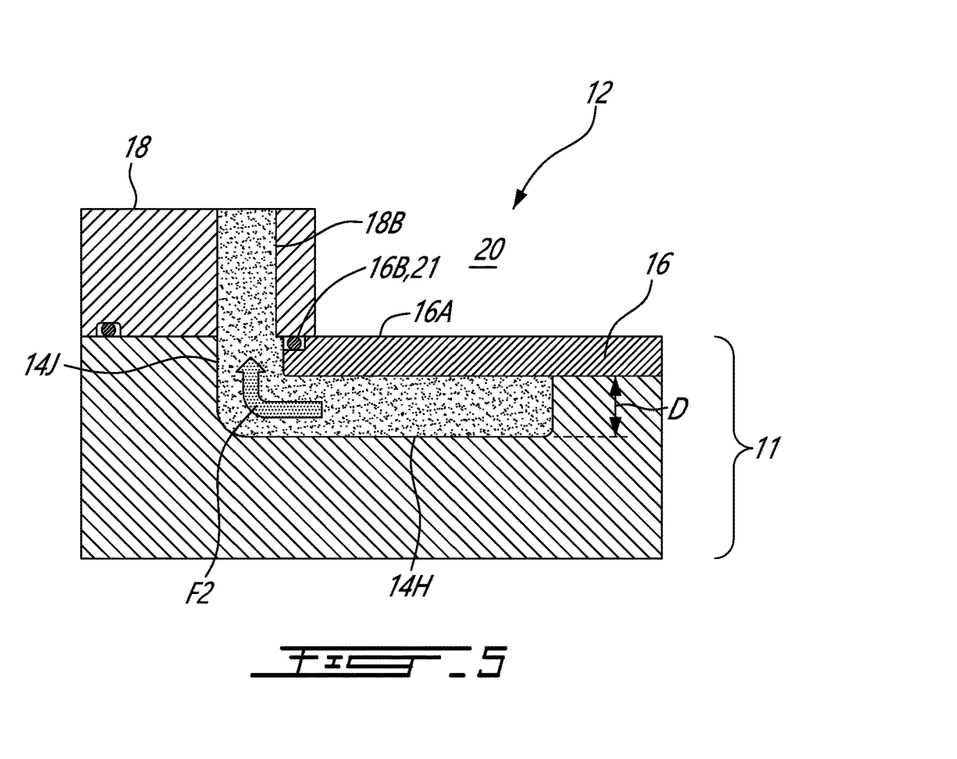
FIG. 5 is a cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuit 12A. The liquid coolant may be circulated out of the housing assembly 12 and within a heat exchanger for extracting the heat. The liquid coolant may then be reinjected in the coolant circuit 12A for further heat extraction.

Figure 6:
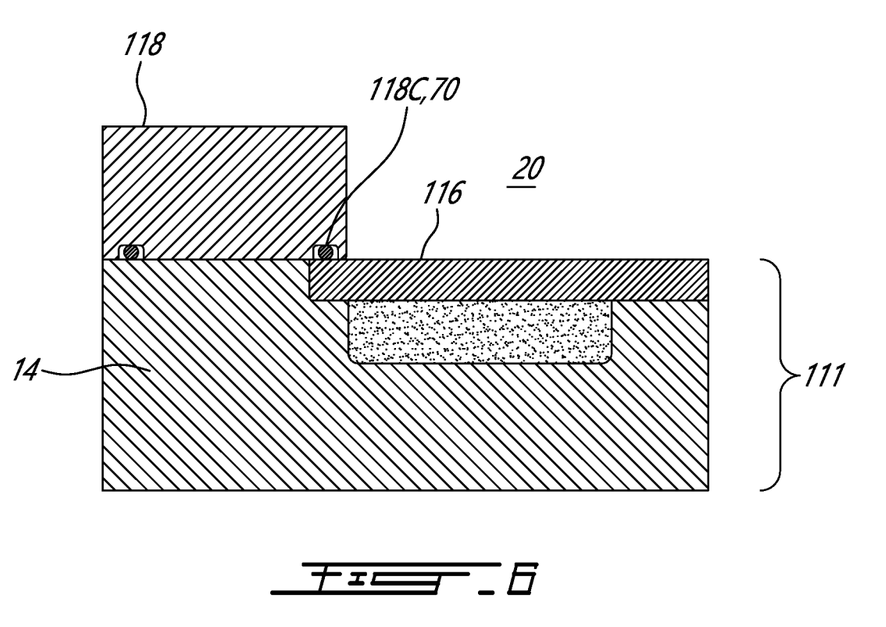
FIG. 6 is a cross-sectional view taken along line B-B of FIG. 2 in accordance with another embodiment.

Referring now to FIG. 6, another embodiment of the outer body, more specifically of the side housing 111 and rotor housing 118, is generally shown. For the sake of conciseness, only elements that differ from the housing assembly 12 of FIGS. 2-5 are described. In the embodiment shown, the rotor housing 118 defines a groove 118C that receives the seal 70.

The side housings of these rotary internal combustion engines are subjected to high pressure and thermal loads while having to provide running surface for the rotor. These running surfaces may be required to remain flat and cool to provide optimal sealing and to be of sufficient hardness to minimize wear. A material of choice for the rotor housing and the side housings may be aluminum due to its light weight and high thermal conductivity. However, the running surface of the aluminum housing may not be sufficiently wear-resistant. When using soft material like standard aluminum, the surface between the side and rotor housing is subject to wear and fretting. It may be possible to alleviate this drawback by using a wear resistant aluminum, such as an aluminum-silicon-carbide alloy. However, such a material is difficult to machine.

Figure 7:
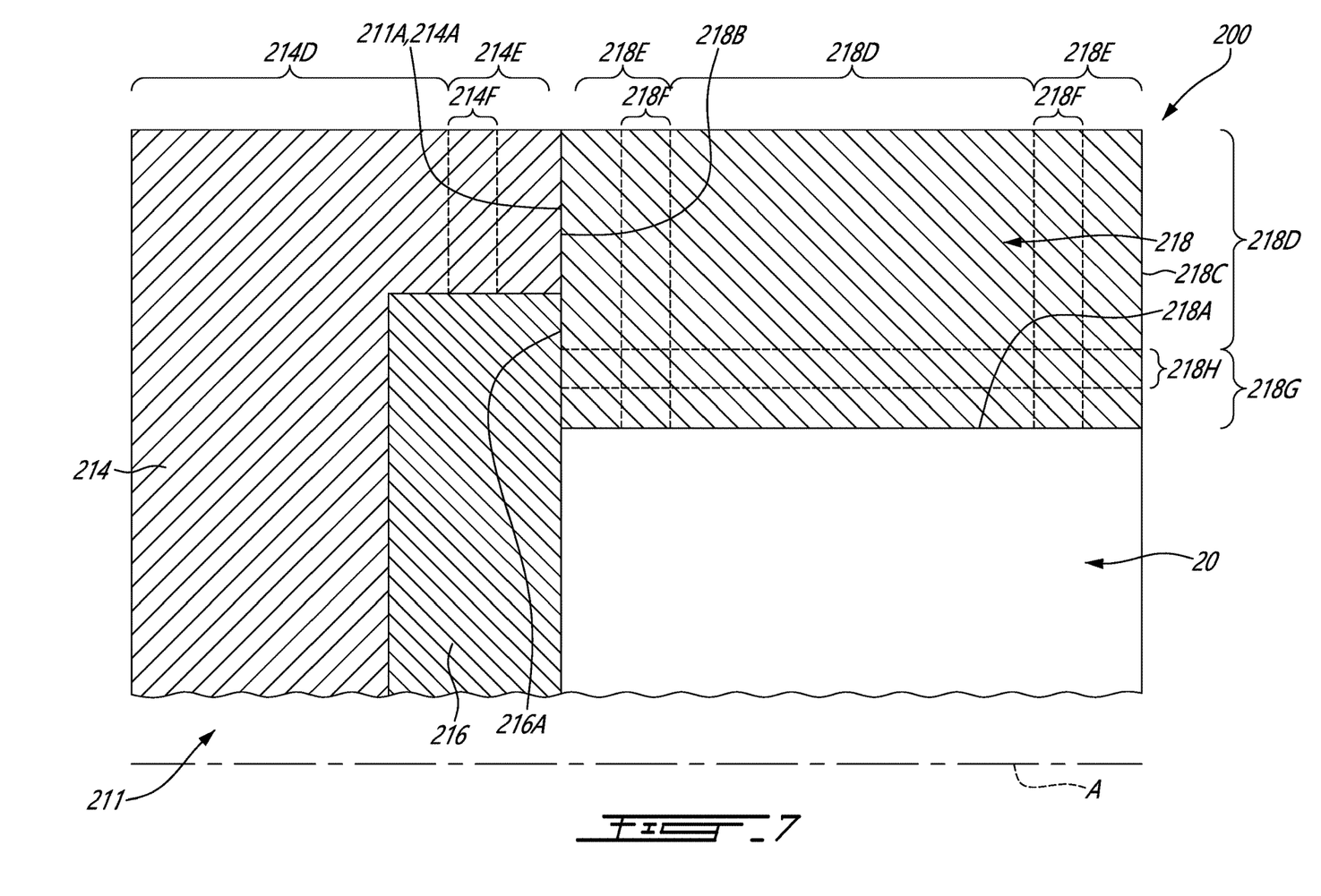
FIG. 7 is a cross-sectional view illustrating a housing assembly in accordance with one embodiment to be used with the rotary engine of FIG. 1.

Referring now to FIG. 7, a possible embodiment of a housing assembly at least partially alleviating the aforementioned drawbacks is shown at 200. The features described below with reference to FIG. 7 may be applied to any of the rotary internal combustion engines described in this disclosure.

The housing assembly 200 includes a rotor housing 218 extending around axis A, which may correspond to a central axis of a crankshaft driven by the rotor 24 (FIG. 1). The central axis A may correspond to a central axis of the rotor housing 218. The rotor housing 218 has a peripheral inner face 218A that extends around the axis A and that faces the rotor cavity 20. The rotor housing 218 has a first face 218B at a first side and a second face 218C at a second side opposite the first side. The peripheral inner face 218A extends from the first face 218B to the second face 218C.

As for the other engine described above, the housing assembly 200 includes a side housing 211. Although FIG. 7 only shows one side housing 211, another side housing is located on an opposite side of the rotor housing 218. It is not illustrated in FIG. 7 for clarity. The description below applies to both of the side housings.

The side housing 211 is secured to the first side of the rotor housing 218 and defines a first inner face 211A facing the rotor cavity 20 and the rotor housing 218. In the embodiment shown, the side housing 211 includes a side wall 214 and a side plate 216 as described above with reference to FIGS. 4-6. The first inner face 211A of the side housing 211 may therefore be defined conjointly by the side wall 214 and by the side plate 216. More specifically, the side wall 214 has an axial peripheral face 214A and the side plate 216 has an axial face 216A. The axial peripheral face 214A surrounds the axial face 216A of the side plate 216. The axial peripheral face 214A abuts the first face 218B of the rotor housing 218. The axial face 216A of the side plate 216 faces both of the first face 218B of the rotor housing 218 and the rotor cavity 20. In some embodiments, the axial face 216A of the side plate 216 may be distanced from the first face 218B of the rotor housing 218 by a gap.

Still referring to FIG. 7, in the exemplified embodiment, the rotor housing 218 has a main body 218D and two external layers 218E disposed on opposite sides of the main body 218D. The main body 218D may thus be in between the two external layers 218E. The two external layers 218E define respectively the first face 218B and the second face 218C of the rotor housing 218.

The main body 218D may be made of a base material whereas the external layers 218E may be made of an alloy including the base material. In the context of the present disclosure, the expression "base material" may include an alloy. The base material may thus be itself an alloy, also referred to as a first alloy. The external layers 218E may therefore be made of a mixture, also referred to as a second alloy, between the first alloy of the base material and a reinforcement phase. The wear-resistance of the alloy is greater than that of the base material. The expression "wear-resistance" may imply that a hardness of the alloy is greater than a hardness of the base material. Wear-resistance as understood in the current disclosure refers to an ability of a material to resist wear either by friction with the rotor 24, by friction with the side housings 211, or any combinations of the above. In some embodiments, the base material may be aluminum, such as 7075-T6, 2219-T6, or any equivalent, and the alloy may be an aluminum-based alloy. For instance, the alloy may be aluminum-silicon-carbide. The aluminum may be preferred for the rotor housing 218 because of its high thermal conductivity. The side housings 211 may be made of iron-based material for some applications where weight is less of a concern. The external layer may be a metal matrix composite (MMC). Another option may include the use of titanium diboride (TiB2) reinforcement. The external layer may be made of A205 aluminum. The external layer may be made of titanium diboride. These materials are contemplated for external layers of one or more of the rotor housing and the side housings. The rotor housing 218 may be made from iron-based alloy (e.g., steel, cast iron), with a more resistant layer at the interface.

As shown in FIG. 7, the main body 218D and the external layers 218E are monolithically connected to one another. In other words, the rotor housing 218 may be a single monolithic body that defines both of the main body 218D and the external layers 218E. A thickness of each of the external layers 218E may be at least about 5 thousandths of an inch and at most about 125 thousandths of an inch. In some embodiments, the thickness is at least about 50 thousandths of an inch to about 100 thousandths of an inch. In this disclosure, the expression "about" implies variations of plus or minus 10%.

In the embodiment illustrated, the external layers 218E may each include a transition layer 218F, which is delimited with dashed lines in FIG. 7, that extends from the main body 218D towards the first face 218B or the second face 218C of the rotor housing 218. A thickness of the transition layer 218F may be about 50% of a thickness of the external layer 218E. The transition layer 218F may be used to gradually transition the material of the rotor housing 218 from the base material to the alloy. A ratio of a mass of the base material to a mass of the alloy by unit of volume (e.g., cubic inch) gradually decreases within the transition layer 218F from the main body 218D towards the first face 218B and the second face 218C of the rotor housing 218. The ratio may vary linearly within the transition layer 218F. The ratio may vary along any suitable transition (e.g., non-linear) to optimize part manufacturability and performance.

The side housing 211 of this embodiment may also include a main body and an external layer. More specifically, the side wall 214 includes a main side body 214D and an external side layer 214E. The external side layer 214E defines the axial peripheral face 214A of the side wall 214. The axial peripheral face 214A is in abutment against the first face 218B of the rotor housing 218.

The main side body 214D may be made of a base material whereas the external side layer 214E may be made of an alloy including the base material. As aforementioned, the base material may be itself an alloy (e.g., the first alloy). The external side layer 214E may therefore be made of a mixture, also referred to as a second alloy, between the alloy of the base material and a reinforcement phase. In some embodiments, the base material may be aluminum, such as 7075-T6, 2219-T6, or any equivalent, and the alloy may be an aluminum-based alloy. For instance, the alloy may be aluminum-silicon-carbide. The base material and the alloy used for the side wall 214 may differ than the base material and the alloy used for the rotor housing 218.

In the embodiment illustrated, the external side layer 214E may include a transition side layer 214F, which is delimited with dashed lines in FIG. 7, and that extends from the main side body 214D towards the axial peripheral face 214A of the side wall 214. A thickness of the transition side layer 214F may be about 50% of a thickness of the external side layer 214E. The transition side layer 214F may be used to gradually transition the material of the side wall 214 from the base material to the alloy. A ratio of a mass of the base material to a mass of the alloy by unit of volume (e.g., cubic inch) gradually decreases within the transition side layer 214F from the main side body 214D towards the external side layer 214E. The ratio may vary linearly within the transition layer 214F.

A remainder of the first inner face 211A of the side housing 211 may be defined by the side plate 216, which may be made of silicon carbide. The side plate 216 may be made entirely of silicon carbide and, thus, may not require the alloy used for the external layers of the side wall 214 and of the rotor housing 218 since the side plate 216 may be made of a material hard enough to resist wear during use (e.g., silicon carbide). The side plate 216 may thus be devoid of the alloy used for the side wall 214 and rotor housing 218. In an alternate embodiment, the side plate 216 may include a main body made of the base material and an external layer made of an alloy including the base material; the external layer defining the axial face 216A of the side plate 216.

Still referring to FIG. 7, the rotor housing 218 may further include an external peripheral layer 218G extending from the main body 218D to the peripheral inner face 218A of the rotor housing 218. The external peripheral layer 218G may be made of the alloy being more resistant than the base material of the main body 218D of the rotor housing 218. The external peripheral layer 218G may be made of aluminum-silicon-carbide or any other equivalent material suitable to sustain the operating conditions in the combustion chambers of the rotary engine. The external peripheral layer 218G may include a transition peripheral layer 218H used to gradually transition the material of the rotor housing 218 from the base material of the main body 218D to the alloy. However, in some embodiments, the rotor housing 218 may be devoid of the external layer of the allow at the peripheral inner face 218A and may instead be protected against wear via a thermal spray (HVOF) coating (e.g., very hard carbide).

Figure 8:
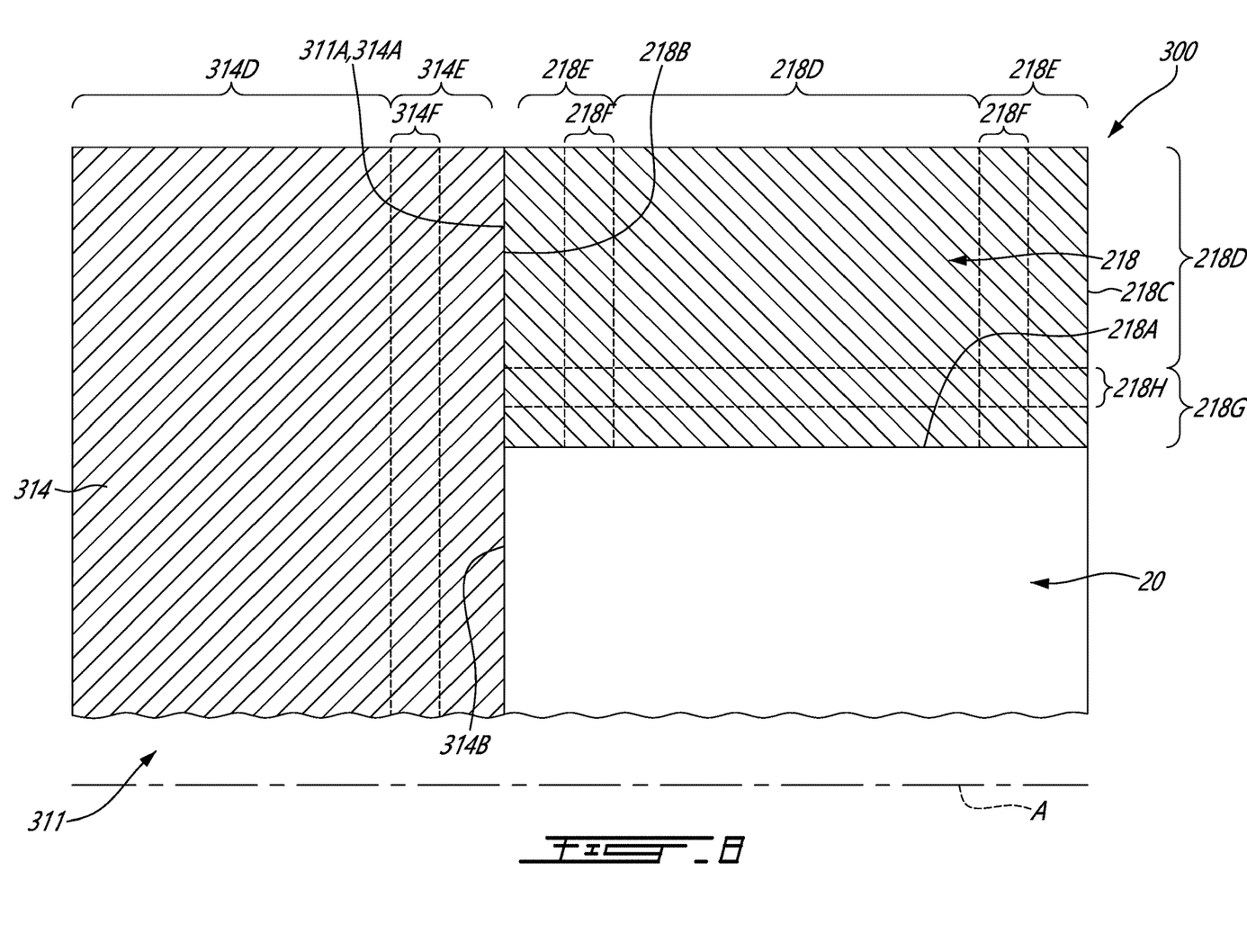
FIG. 8 is a cross-sectional view illustrating a housing assembly in accordance with another embodiment to be used with the rotary engine of FIG. 1.

Referring now to FIG. 8, another embodiment of a housing assembly is shown at 300. For the sake of conciseness, only features differing from the housing assembly 200 of FIG. 7 are described herein below. Like reference numerals represent like features in FIGS. 7 and 8.

In the embodiment shown, the side housing 311 includes only a side wall 314 and is devoid of the side plate. Consequently, an entirety of a first inner face 311A of the side housing 311 is defined by the side wall 314. The first inner face 311A thus defines an axial peripheral face face 314A and an axial face 314B. These two faces are two distinct sections of the first inner face 311A of the side housing 311.

The side wall 314 may include a main body 314D and an external layer 314E. The external layer 314E of the side wall 314 defines the first inner face 311A. The external layer 314E is therefore in abutment against the first face 218B of the rotor housing 218 and is exposed to the rotor cavity 20 for contacting the rotor 24 (FIG. 1).

The main body 314D may be made of a base material whereas the external layer 314E may be made of an alloy including the base material. As previously mentioned, a wear-resistance of the alloy is greater than that of the base material. In some embodiments, the base material may be aluminum, such as 7075-T6, 2219-T6, or any equivalent, and the alloy may be an aluminum-based alloy. For instance, the alloy may be aluminum-silicon-carbide. Other suitable materials as listed above may be used.

The main body 314D and the external layer 314E are monolithically connected to one another. In other words, the side wall 314 may be a single monolithic body that defines both of the main body 314D and the external layer 314E. A thickness of each of the external layer 314E may be at least about 5 thousandths of an inch and at most about 125 thousandths of an inch, preferably from 50 to 100 thousandths of an inch.

In the embodiment illustrated, the external layer 314E may each include a transition layer 314F, which is delimited with dashed lines in FIG. 8, that extends from the main body 314D towards the first inner face 311A of the side housing 311. A thickness of the transition layer 314F may be about 50% of a thickness of the external layer 314E. The transition layer 314F may be used to gradually transition the material of the side wall 314 from the base material to the alloy. A ratio of a mass of the base material to a mass of the alloy by unit of volume (e.g., cubic inch) gradually decreases within the transition layer 314F from the main body 314D towards the external layer 314E. The ratio may vary linearly within the transition layer 314F.

Figure 9:
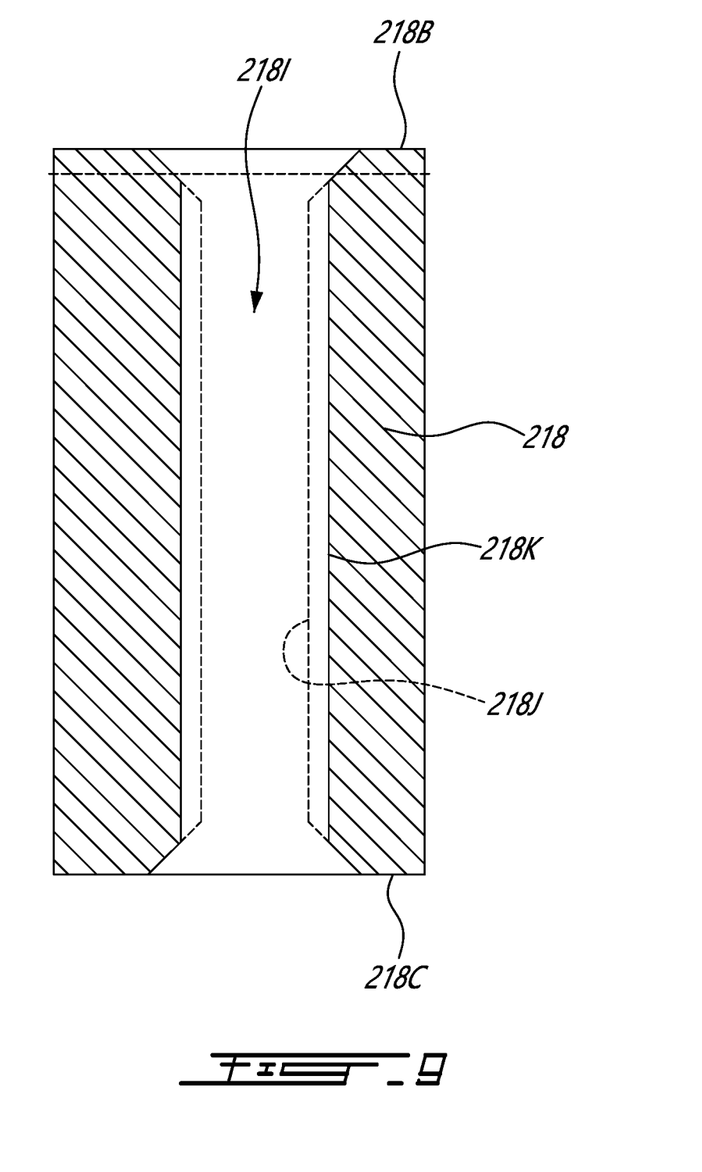
FIG. 9 is a cross-sectional view of a rotor housing illustrating coolant passages thereof.

Referring now to FIG. 9, the rotor housing 218 may define a plurality of cooling passages. A cooling passage 2181 is shown in FIG. 9 and extends from the first face 218B to the second face 218C. More detail about those cooling passages are presented below with reference to FIG. 5. The cooling passage 2181 may be countersunk at both of the first face 218B and the second face 218C. This may remove the alloy from the machining allowance of cooling passage 2181. This may reduce the wear on the tools. Stated differently, FIG. 9 shows an outlet of the cooling passage 2181 before machining at 218J and after machining at 218K.

Figure 10:
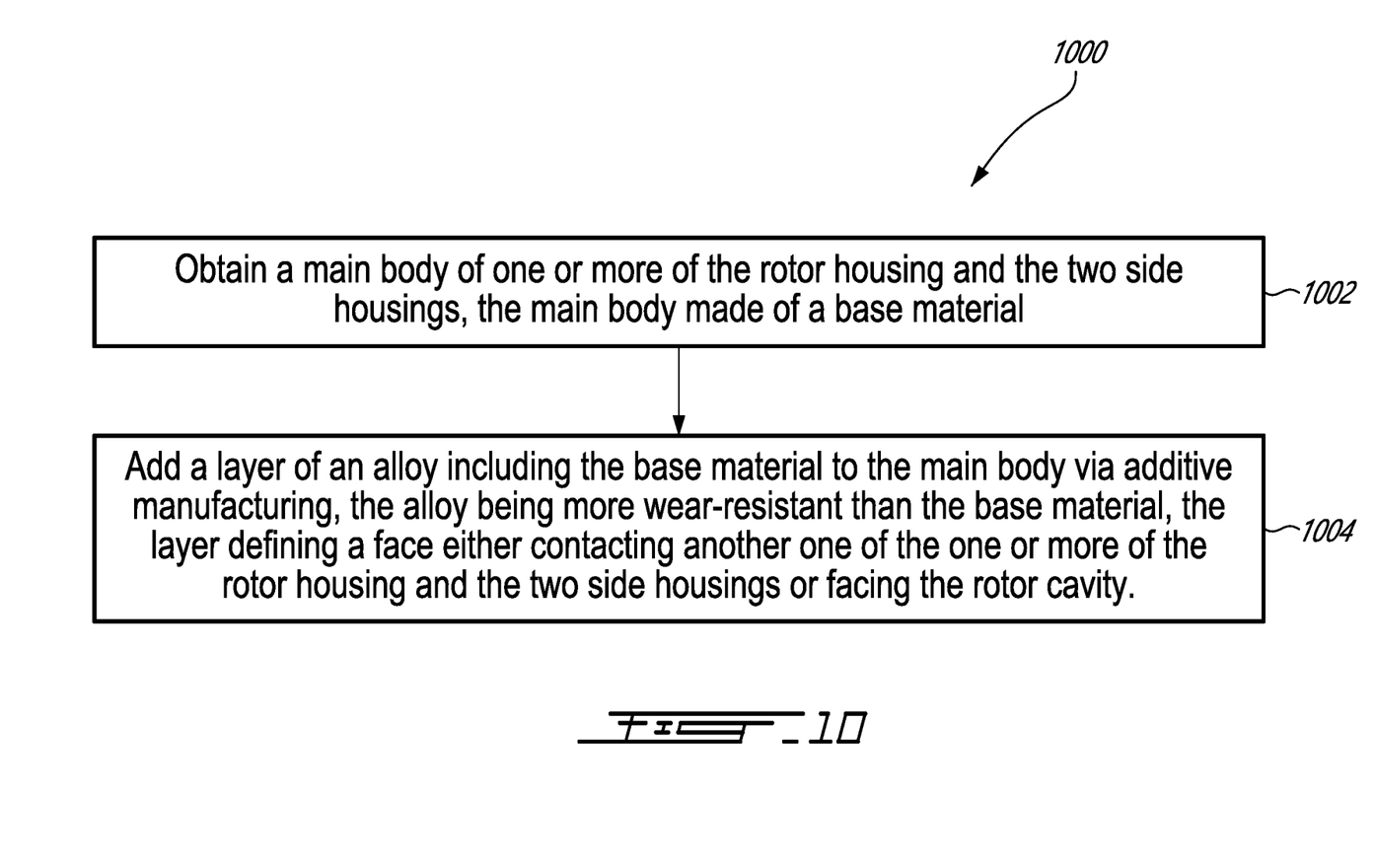
FIG. 10 is a flowchart illustrating steps of manufacturing a housing assembly of a rotary internal combustion engine.

Referring now to FIG. 10, a method of manufacturing the housing assembly 200, 300 is shown at 1000. The method 1000 includes obtaining a main body 218D, 214D, 314D of one or more of the rotor housing 218, and the two side housings 211, 311 the main body made of a base material at 1002; and adding a layer of an alloy including the base material to the main body 218D, 214D, 314D via additive manufacturing at 1004. As mentioned above, the alloy is more wear-resistant than the base material. The alloy defines a face either contacting another one of the one or more of the rotor housing 218 and the two side housings 211, 311 or facing the rotor cavity 20.

The method 1000 may include performing a machining step on the face to reach desired dimensions of the one or more of the rotor housing and the two side housings. This may include machining the alloy.

The obtaining of the main body 218D, 214D, 314D at 1002 made of the base material includes obtaining the main body made of aluminum. The adding of the layer of the alloy at 1004 may include adding a layer of aluminum-silicon-carbide.

In the present embodiment, the adding of the layer of the alloy via additive manufacturing at 1004 includes successively adding sub-layers on top of one another using a plurality of feedstock having a decreasing ratio of a mass of the base material to a mass of the alloy by unit of volume. More specifically, the rotor housing and/or the side housings may be manufactured using Powder Bed Fusion (PBF), or any equivalent powder-based process. The powder density may vary from 100% of the base material to 100% of the alloy. This transition layers described above may be made with an initial powder of 100% of the base material with a final powder of 100% of the alloy. The transition may be linear (50% base material and 50% alloy at the transition center), or any other suitable transition shape to optimize for stress, manufacturability or other constraints. The additive manufacturing process may create a near-finished surface. Final machining may be needed to achieve final dimensions and surface finish at some area such as coolant holes and datum surfaces. Final machining may be achieved using traditional subtractive manufacturing methods (e.g., drilling, milling, grinding, etc).

The rotor housing and side housings may also be manufactured using Direct Energy Deposition, or any equivalent metal deposition process. For this process, a near-finished part made of the base material may be produced. The main production method may be machined from billet, cast or additive manufacturing other than DED. Then, the alloy may be deposited on the running surfaces as a secondary operation. This process may be done for new parts, or for maintenance. Alternatively, the rotor and side housings may be created as a near-finished part using Direct Energy Deposition, or any equivalent process. The near-finished part may feature the bulk, base material and the wear resistant layer, referred to above as the alloy. Final machining may be achieved using traditional subtractive manufacturing methods.

The parts may alternatively be manufactured using Ultrasonic Additive Manufacturing. For this process, a near-finished part made of the base material may be produced, either with other additive manufacturing process or using traditional subtractive manufacturing methods. This part may serve as base plate for the ultrasonic additive manufacturing. The alloy may be deposited in the form of a thin sheet on the running surfaces.

The method 1000 may include machining the cooling passages 2181 in the main body 218D of the rotor housing 218 before the adding of the layer of the alloy. Alternatively, the method may include obtaining the coolant passages 2181. The cooling passages may be obtained in the as-print housing.

The method 1000 may include countersinking the cooling passages, from the base material through the transition layer, up to the interface. The countersunk in the reinforced layer being a continuation of the countersunk within the base material The countersunk in the external layers are a continuation of the countersunk in the main body.

Without a countersunk in the cooling passage, any machining operation in the housings may require going through the wear-resistant layer. Machining this feature might be difficult, costly, and it may render difficult to achieve the required tolerance or surface finish. With the countersunk hole, the machine allowance material does not include wear-resistant material. Therefore, the manufacturing issues may be avoided. More specifically, it may be required to machine the internal surface of the cooling passage. Without the countersunk, a portion of this internal surface would be defined by the harder alloy, which may be difficult to machine. The dashed line in FIG. 9 illustrates a transition between the base material and the alloy; the harder alloy being above the dashed line. As shown, below the dashed line, there is no overlap between the machined area (space between lines 218J and 218K) and the harder alloy. Therefore, the machining operation to bring the coolant passage from its initial shape depicted at 218J to its final shape depicted at 218K may not interfere with the harder alloy. This is permitted by the countersinking of the coolant passage.

The present disclosure proposes using multi-material rotary engine housings. Soft, standard aluminum may constitute the bulk of the part (e.g., 50% or more of the mass of the part, preferably 75% or more of the mass of the part, preferably 90% or more of the weight of the part), with the wear resistant aluminum (e.g., the reinforced alloy) only applicable at the running surfaces or interfaces needing wear and fretting resistance. The bulk of the part may thus be easier to machine, which may allow most of the housings features to be produced without issues.

Referring back to FIG. 1, the side housings 211 may include a bore 214B (shown schematically with a dashed line) for receiving a bearing. A wear resistant layer, such as the alloy (e.g., aluminum-silicon-carbide) may be used to define a peripheral surface of the bore 214B. A steel bearing housing is usually press-fitted in the bore 214B. More specifically, the side housing defines the bore 214B for receiving the shaft. The shaft is rollingly supported by bearing(s), which include inner and outer races. Thus, the peripheral wall of this bore 214B may be defined by the alloy since it abuts the outer race of the bearing.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A housing assembly for a rotary internal combustion engine, comprising:
   a rotor housing extending around an axis, the rotor housing having a peripheral inner face facing a rotor cavity, a first face at a first side and a second face at a second side opposite to the first side;
   a first side housing secured to the first side of the rotor housing, the first side housing defining a first inner side face facing the rotor cavity and the rotor housing; and
   a second side housing secured to the second side of the rotor housing, the second side housing defining a second inner side face facing the rotor cavity and the rotor housing, the rotor cavity bounded axially between the first side housing and the second side housing,
   one or more of the rotor housing, the first side housing, and the second side housing having:
   a main body made of a base material; and
   an external layer made of an alloy including the base material, a wear-resistance of the alloy greater than that of the base material, the external layer defining one or more of the first face of the rotor housing, the second face of the rotor housing, the first inner side face of the first side housing, and the second inner side face of the second side housing, the external layer including a transition layer extending from the main body, a ratio of a mass of the base material to a mass of the alloy by unit of volume gradually decreases within the transition layer from the main body.

2. The housing assembly of claim 1, wherein the main body and the external layer are monolithically connected to one another.

3. The housing assembly of claim 1, wherein the alloy has a hardness greater than that of the base material.

4. The housing assembly of claim 1, wherein the base material is aluminum and the alloy is aluminum-silicon-carbide.

5. The housing assembly of claim 1, wherein a thickness of the external layer is at least about 5 thousandths of an inch.

6. The housing assembly of claim 5, wherein the thickness of the external layer is at most about 125 thousandths of an inch.

7. The housing assembly of claim 1, wherein the rotor housing defines at least one cooling passage extending from the first face to the second face, the at least one cooling passage being countersunk at one or more of the first face and the second face.

8. The housing assembly of claim 1, wherein the first side housing includes a side wall secured to the rotor housing and a side plate, a peripheral section of the side plate disposed between the side wall and the rotor housing.

9. The housing assembly of claim 8, wherein the side plate is made of silicon carbide, the first inner side face extending around the side plate and abutting the first face of the rotor housing.

10. The housing assembly of claim 9, wherein both of the first inner side face and the first face are defined by the alloy.

11. A rotary internal combustion engine including the housing assembly of claim 1 and a rotor received within the rotor cavity.

12. A method of manufacturing a housing assembly for a rotary internal combustion engine, the housing assembly having a rotor housing and two side housings secured to the rotor housing to define a rotor cavity, the method comprising:

obtaining a main body of one or more of the rotor housing and the two side housings, the main body made of a base material; and adding a layer of an alloy including the base material to the main body via additive manufacturing, the alloy being more wear-resistant than the base material, the layer defining a face either contacting another one of the one or more of the rotor housing and the two side housings or facing the rotor cavity, including successively adding sub-layers on top of one another using a plurality of feedstock having a decreasing ratio of a mass of the base material to a mass of the alloy by unit of volume.

13. The method of claim 12, comprising performing a machining step on the face to reach desired dimensions of the one or more of the rotor housing and the two side housings.

14. The method of claim 12, wherein the obtaining of the main body made of the base material includes obtaining the main body made of aluminum.

15. The method of claim 14, wherein the adding of the layer of the alloy includes adding a layer of aluminum-silicon-carbide.

16. The method of claim 12, comprising obtaining cooling passages in the main body of the rotor housing before the adding of the layer of the alloy.

17. The method of claim 16, comprising countersinking the cooling passages before the adding of the layer of the alloy.

* * * * *